R. McVITIE & A. GRANT.
APPARATUS FOR DEPOSITING OR DROPPING JAM, SUGAR, OR THE LIKE ON OR IN BISCUITS AND LIKE CONFECTIONS.
APPLICATION FILED JULY 27, 1908.
921,874.
Patented May 18, 1909.
2 SHEETS—SHEET 1.
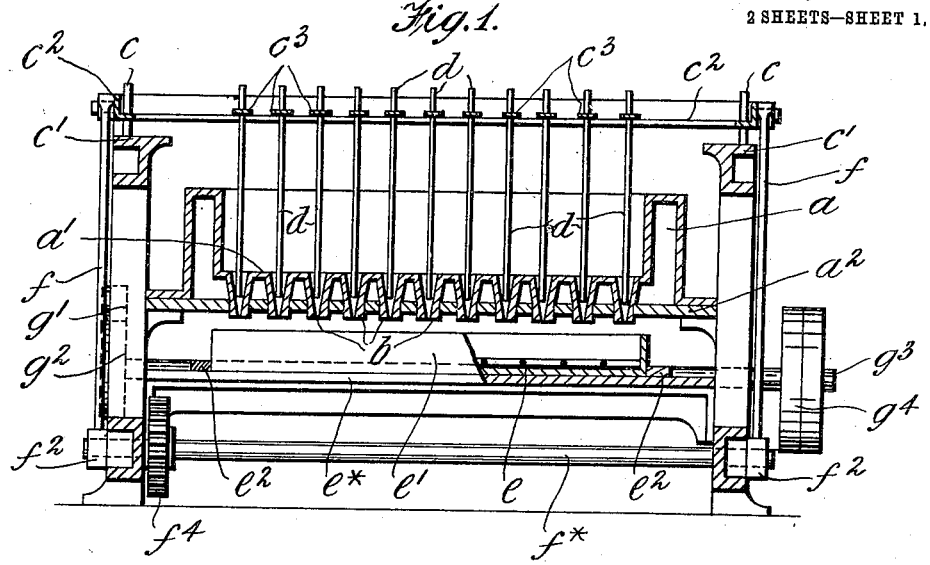
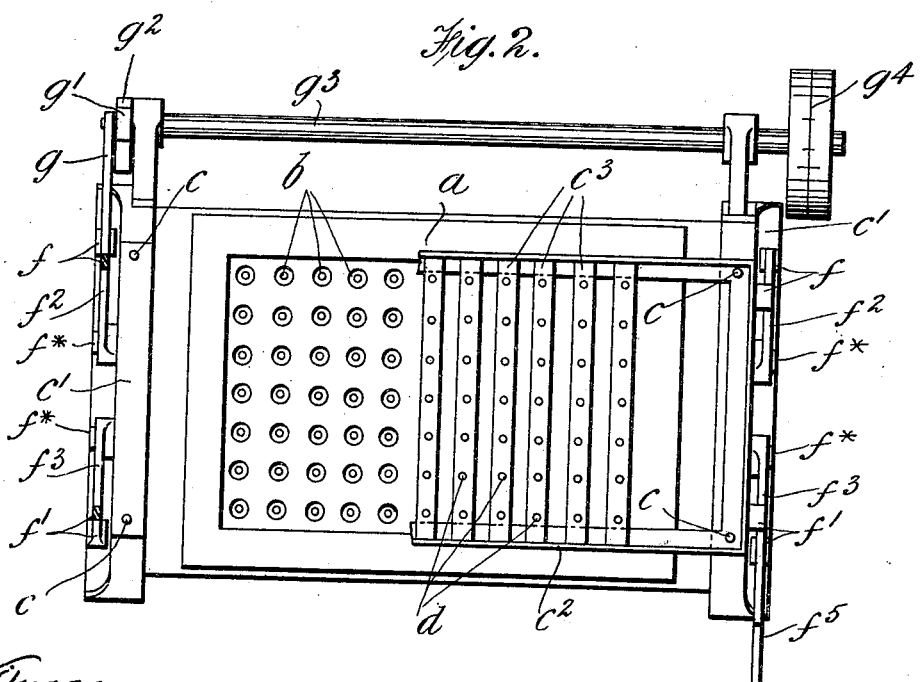

R. McVITIE & A. GRANT.
APPARATUS FOR DEPOSITING OR DROPPING JAM, SUGAR, OR THE LIKE ON OR IN BISCUITS AND LIKE CONFECTIONS.
APPLICATION FILED JULY 27, 1908.
921,874.
Patented May 18, 1909.
2 SHEETS—SHEET 2.
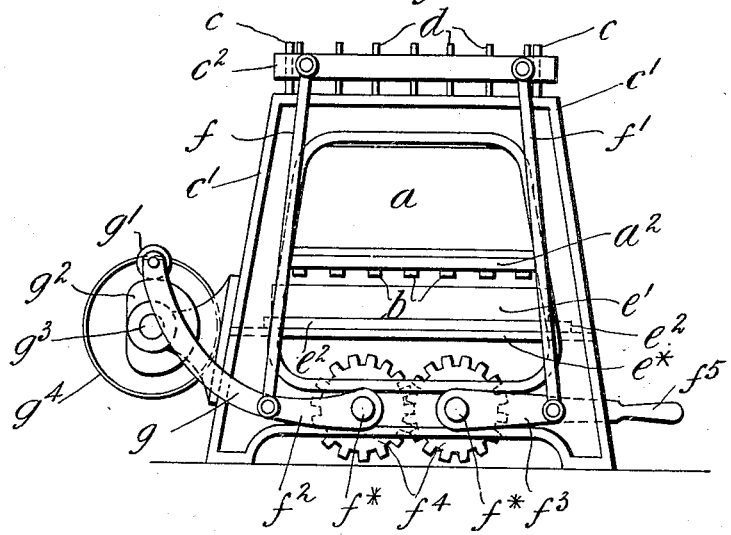
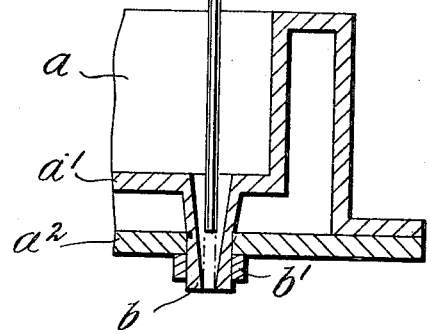
Witnesses
Percy M. Goodwin
G. Chas. Axe
Inventors
Robert McVitie
Alexander Grant
by Their Attorney Frank S. Ahneman

UNITED STATES PATENT OFFICE.

ROBERT McVITIE AND ALEXANDER GRANT, OF EDINBURGH, SCOTLAND.

APPARATUS FOR DEPOSITING OR DROPPING JAM, SUGAR, OR THE LIKE ON OR IN BISCUITS AND LIKE CONFECTIONS.

No. 921,874.     Specification of Letters Patent.     Patented May 18, 1909.

Application filed July 27, 1908. Serial No. 445,516.

*To all whom it may concern:*

Be it known that we, ROBERT McVITIE and ALEXANDER GRANT, subjects of the King of Great Britain and Ireland, and residents of 12 Greenhill Gardens and 13 Kilgraston road, respectively, Edinburgh, Scotland, have invented a certain new and useful Improvement in Apparatus for Depositing or Dropping Jam, Sugar, or the Like on or in Biscuits and Like Confections, of which the following is a specification.

This invention relates to an apparatus worked by power or by hand for depositing or dropping jam, sugar or the like on or in biscuits and like confections and consists essentially of a steam jacketed trough open at top with a perforated bottom plate. These perforations are provided with downwardly extending conical metal tubes or droppers in which are adapted to move, at one and the same time, in a vertical direction, plungers so that the lower orifice of the conical tubes or droppers may be opened or closed. When open, the jam, sugar or the like is deposited or dropped on or into the biscuits which are arranged in a tray located beneath the steam jacketed pan or trough which contains the jam, sugar or the like and in line with the conical tubes or droppers, means being provided whereby the supply of jam or the like is automatically stopped to every tube or dropper after each deposit.

In order that the said invention may be the more readily understood reference is to be had to the following description and accompanying sheets of drawings in which:—

Figure 1 is a vertical section of an apparatus constructed in accordance with the present invention; Fig. 2 a plan, parts being broken away; and, Fig. 3 an end view. Fig. 4 is a detail view of one of the conical tubes or droppers.

In said drawings, $a$—Figs. 1, 2 and 3—is the steam jacketed trough or pan in which the jam, sugar or the like is placed, the bottom plate $a'$ of the pan being provided with a series of openings terminating in the downwardly extending conical tubes or droppers $b$ which pass through the bottom plate $a^2$ of the steam jacket and are secured thereto by nuts $b'$—Fig. 4. Mounted on vertical pins $c$ on the frames $c'$ is a rectangular frame $c^2$ provided with a series of transverse bars $c^3$ into which are screwed the plungers $d$ which work in the conical tubes or droppers $b$ and which when raised as in Figs. 1, 3 and 4 permit the jam, sugar or the like to flow therethrough and to drop on or into the biscuits which are arranged on a grid or the like $e$ in the tray $e'$, suitable stops $e^2$ on the cross bar $e^*$ being provided to insure the alinement of the grid and its tray. On the requisite amount of jam, sugar or the like being deposited the frame $c^2$ is allowed to fall and to simultaneously close all the conical tubes or droppers.

To effect the rise and fall of the frame $c^2$ the same is connected by links $f, f'$ pivoted to arms $f^2, f^3$, the shafts $f^*$ of which extend lengthwise of the apparatus as in Fig. 1 and are geared together by gear wheels $f^4$ so that by raising or lowering the handle $f^5$—Figs. 2 and 3—of arm $f^3$ by hand the frame and its plungers are correspondingly raised or lowered, or if it be desired to operate the frame and plungers by power then one of the arms $f^2$ is provided with an extension $g$ carrying at its outer end a roller $g'$ adapted to contact with the cam $g^2$ on shaft $g^3$ driven by pulley $g^4$ or other suitable device. To adjust the height of the plungers $d$ the same are screw threaded at their upper ends and are locked to the transverse bars $c^3$ by nuts $d^*$ as in Fig. 4.

Having now described our invention what we claim as new and desire to secure by Letters Patent of the United States is:—

In an apparatus for depositing or dropping jam, sugar or the like on to or into biscuits or like confections the combination of a steam jacket and pan, a series of downwardly extending conical tubes or droppers connected to said pan, standards carrying the pan, a frame above the pan, a series of vertical plungers carried by said frame, links pivotally connected to the frame, levers for raising and lowering the links, shafts on which the levers are mounted, and gear wheels on the shaft for communicating motion to the shafts in opposite directions.

In testimony whereof we have affixed our signatures in presence of two witnesses.

ROBERT McVITIE.
                ALEXANDER GRANT.

Witnesses:
    FREDERICK PIATT,
    GEORGE COBB.